United States Patent [19]
McGinty

[11] 3,964,567
[45] June 22, 1976

[54] LOW COOLANT LEVEL PROTECTION SYSTEM

[76] Inventor: Otto Wayne McGinty, Box 2961, Ripley, Okla. 74062

[22] Filed: Dec. 23, 1974

[21] Appl. No.: 535,498

[52] U.S. Cl. .......................... 180/103 R; 123/198 D; 340/59
[51] Int. Cl.² .......................................... F02B 77/08
[58] Field of Search ............. 180/103, 82 R; 340/59, 340/222, 417, 419; 123/198 D, 198 DB, 198 DC; 137/513.5

[56] References Cited
UNITED STATES PATENTS

| | | | |
|---|---|---|---|
| 1,936,149 | 11/1933 | Apple | 180/82 R |
| 2,056,249 | 10/1936 | Bystricky | 137/513.5 X |
| 2,111,991 | 3/1938 | Richard | 137/513.5 X |
| 2,372,456 | 3/1945 | Stewart | 137/513.5 X |
| 2,940,560 | 6/1960 | Kline | 340/59 |
| 3,179,920 | 4/1965 | McGinty | 340/59 |
| 3,431,028 | 3/1969 | Yoder | 137/513.5 X |
| 3,590,798 | 7/1971 | Goodwin | 123/198 D |
| 3,605,711 | 9/1971 | Fuso | 123/198 D |
| 3,683,959 | 8/1972 | Tsuji et al. | 137/513.5 X |

FOREIGN PATENTS OR APPLICATIONS

| | | | |
|---|---|---|---|
| 698,212 | 11/1961 | Canada | 180/103 |

Primary Examiner—M. H. Wood, Jr.
Assistant Examiner—Jack D. Rubenstein
Attorney, Agent, or Firm—Head, Johnson & Chafin

[57] ABSTRACT

A low coolant level protection system for a vehicle having a radiator, an engine operated by a fluid fuel, a fuel source, and a conduit connecting the fuel source with the engine, the low water protection system including a probe extending within the radiator for conductive contact with coolant when the coolant is at proper operating levels, a voltage source, and a valve positioned in the conduit between the fuel source and the engine, the valve having an electric operated closure means in series with the voltage source and probe such that when the probe has continuity with the coolant in the radiator the value is actuated to an opened position allowing unrestricted flow of fuel to the engine, and when the continuity between the probe and coolant is lost, the valve closure member is moved to the closed position allowing only a preselected restricted rate of flow of fuel to the engine such that the operator may continue to operate the vehicle but at a greatly reduced rate of speed.

1 Claim, 4 Drawing Figures

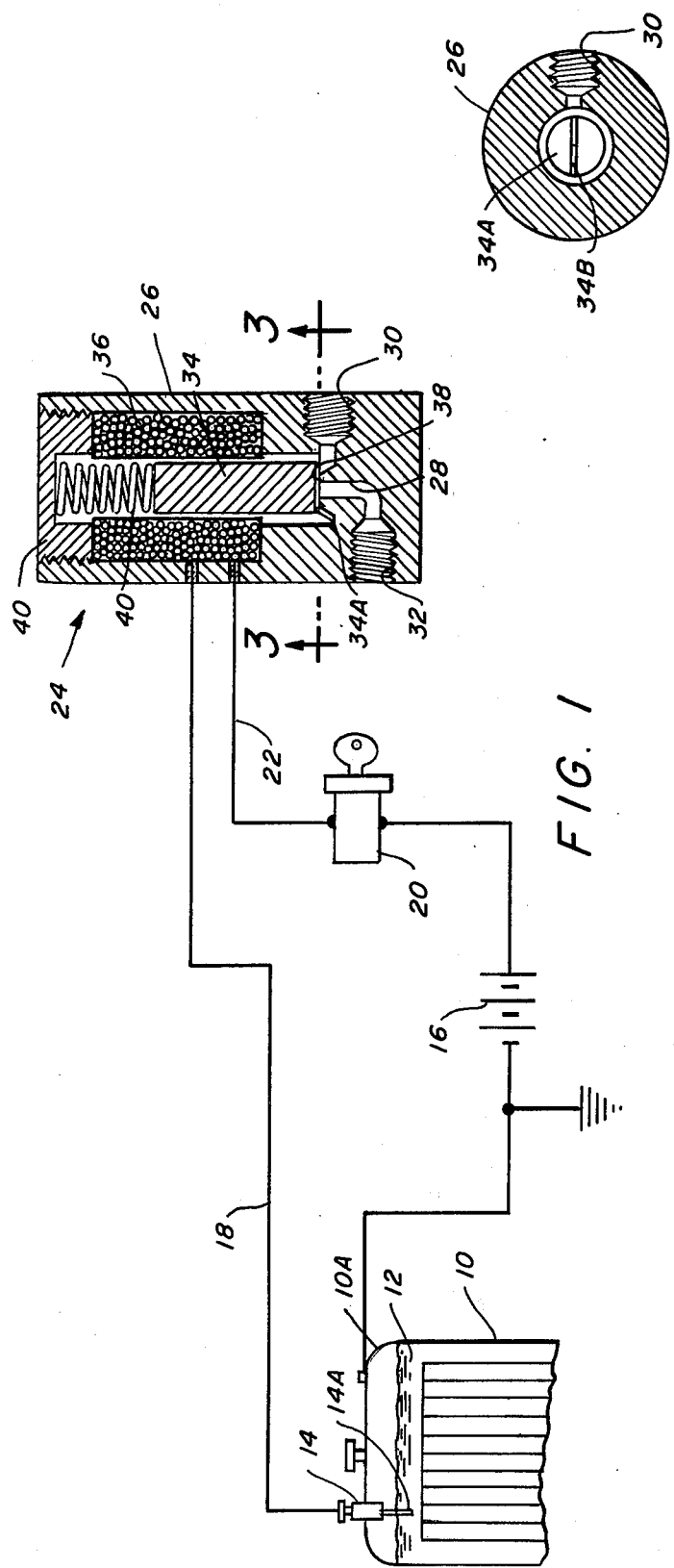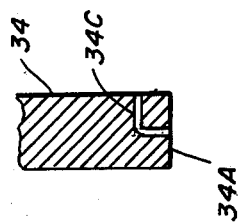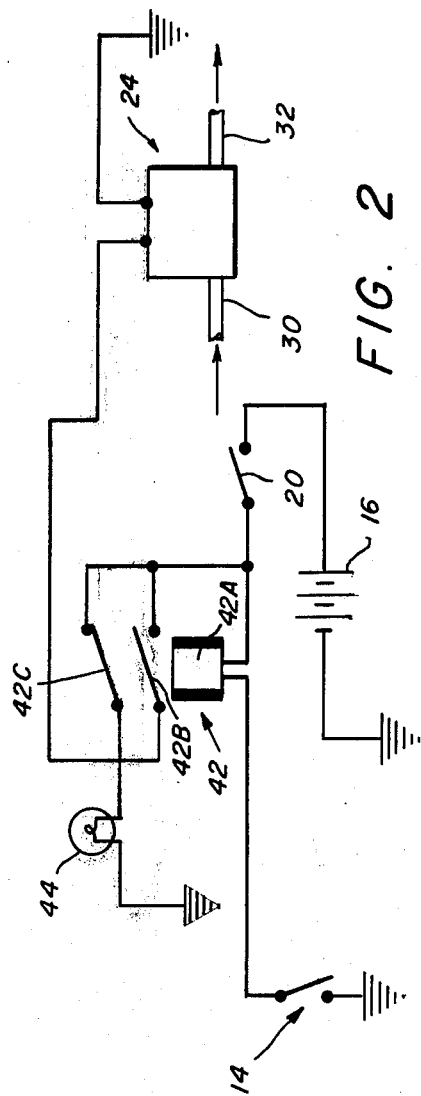

LOW COOLANT LEVEL PROTECTION SYSTEM

BACKGROUND, SUMMARY AND OBJECTS OF THE INVENTION

Others have provided devices for detecting engine low coolant levels. Such devices include indicators for signaling when the coolant level drops below a preselected point. Indicators of and within themselves, however, do not guarantee protection of the engine since the indicators may be ignored, either intentionally or unintentionally.

The present invention is directed toward a system for protecting a vehicle from damage when the coolant level falls below a preselected level. The system of the invention is primarily differentiated from the known methods in that it protects the engine in a way which does not depend upon the attention of the operator and, in addition, enables the operator to move the vehicle from hazardous driving conditions to a place of safety or repair.

Particularly, the invention includes a low water detection probe which actuates a valve in the engine fuel system. The valve has two positions, an opened and a closed position. In the opened position (which attitude the valve takes when the engine coolant level is at the normal operating level), fuel flow is unrestricted from the fuel source through the valve to the engine, enabling the operator to operate the engine at the speed desired. When a low coolant level occurs, however, the valve is moved to the closed position. In the closed position fuel is not completely shut off, since this would cause the vehicle to come to a halt, possibly in a dangerous area of traffic. Instead, in the closed position the valve provides a restricted fuel flow rate. The restricted rate is preselected and is sufficient to enable the operator to operate the vehicle at a low rate of speed to move the vehicle to an area of safety and to an area wherein repairs can be made. The low rate of speed is such as to cause the operator to seek correction of the coolant level as soon as possible, but at the same time the rate of speed is such that it does not leave the operator of the vehicle stranded. In this way maximum protection to the engine of the vehicle is afforded to guard against damage from low coolant levels, but at the same time the operator of the vehicle is not endangered by the complete stoppage of the vehicle. The system does not require the operator to observe warning lights, sounds or so forth and therefore is, from this standpoint, essentially foolproof.

It is therefore an object of this invention to provide an improved low coolant level protection system for vehicles.

More particularly, an object of this invention is to provide a low coolant level protection system for vehicles which does not require the attention of the operator to detect the occurrence of a low level and, in addition, which does not shut down completely the engine of the vehicle when a low coolant level occurs so as to potentially place the operator in a dangerous predicament.

Still more particularly, an object of this invention is to provide a low coolant level protection system for a vehicle including a valve in the fuel system arranged in a way that when proper coolant levels exist unrestricted fuel flow to the engine is provided, but when coolant levels drop below the normal operating level, the flow of fuel to the valve is substantially reduced to cause the operator to seek correction of the condition but without jeopardizing his safety.

Other and more specific objects of the invention will be fulfilled in the following description and claims, taken in conjunction of the attached drawings.

DESCRIPTION OF VIEWS

FIG. 1 is a diagram of a system incorporating the low coolant level protection system of this invention and showing an embodiment of a valve used therein in cross section.

FIG. 2 is a wiring diagram of an alternate embodiment of the system using a relay and providing a light indicator.

FIG. 3 is a cross sectional view taken along the line 3—3 of FIG. 1.

FIG. 4 is a cross sectional of an alternate embodiment of a plunger employed in a valve of this invention to provide a preselected restricted fuel flow rate when the valve is in the closed position.

DETAILED DESCRIPTION

Referring to the drawings and first to FIG. 1, a low coolant protection system for a vehicle as shown. The vehicle itself is not illustrated, and it is understood that the vehicle includes an engine utilizing a fluid fuel, the engine having a fuel source and a conduit connecting the fuel source to the engine.

The engine cooling system includes a radiator 10 having an upper portion 10a. Coolant 12 fills the radiator 10 and the normal level of the coolant extends within the upper portion 10a.

Positioned in the upper end of the radiator 10 is a probe 14 formed of a body of insulated material secured to the radiator with a lower uninsulated portion 14a extending down within the radiator portion 10a so that when the engine coolant 12 is at a normal level continuity is made with the portion 14a of the probe.

A battery 16, which may be the vehicle battery normally employed for starting, lights and so forth, has one pole connected to the radiator 10, which will normally be the pole of the battery grounded. A conductor 18 extends from the probe 14, the conductor 18 having continuity with the uninsulated lower portion 14a. A switch 20 is used, which may be part of the vehicle ignition switch. Conductor 22 extends from the switch 20 to a fuel flow control valve generally indicated by numeral 24. Conductor 18 also connects to valve 24.

The flow control valve 24 includes a body portion 26 having a fluid passageway 28 therein. The passageway 28 communicates with an inlet 30 and an outlet 32. The valve 24 is connected in the vehicle fuel line conduit extending from vehicle fuel source to the vehicle engine (none of which is shown) by connection of the conduit to openings 30 and 32.

Within the valve housing 20 is a vertically positionable plunger 34, and surrounding the plunger, a coil 36.

The plunger 34 functions as a valve closure member. The lower end 34a seats against a valve seat 38 formed in the valve body and surrounding passageway 28. A spring 40 urges the plunger 34 towards the valve seat 38 so that when coil 36 is not energized the plunger 34 is closed against valve seat 38, but when coil 36 is energized plunger 34 is withdrawn against the spring 40 to open contact with valve seat 38, permitting unrestricted flow of fuel through the valve. A cover 42 closes the upper end of the valve body 26.

Conductors 18 and 22 extend through insulated openings in the valve body to connect with coil 36.

FIG. 3 shows an end view of the plunger or valve closure member 34. The end of the closure member is provided with a shallow depth groove 34b. When the plunger 34 is closed against the valve seat 38 by the force of spring 40, which occurs when the coil 36 is not energized, the valve is not fully closed but permits a preselected limited rate of fuel to flow through the valve. The limited rate of fuel flow is determined by the depth and width of groove 34b. The purpose of permitting the limited fuel flow is to permit the vehicle engine to operate at a low rate even though the level of coolant 12 in radiator 10 has dropped below the normally desired level. In this way, when a below normal coolant level occurs the operator of the vehicle is not stranded in a potentially unsafe circumstance, such as on a busy expressway, but is limited in the rate of operation of the vehicle so as to permit the operator to move the vehicle out of such dangerous situation and to drive the vehicle to a place of repair or where more coolant liquid can be added to the radiator.

FIG. 4 is a cross sectional view of the valve closure member 34 showing an alternate arrangement. Rather than a groove being placed in the seating surface 34b, a small diameter hole 34c is drilled intersecting the seating surface 34a and passing out to one side of the closure member. Thus when the closure member is closed a small amount of fuel flow can occur through passageway 34b but when the closure member is withdrawn, as coil 36 is energized, unrestricted flow of fuel through the valve is obtained.

FIG. 2 shows an alternate embodiment of the invention, in diagrammatic form. The probe 14 is shown in the form of a switch which actuates a relay, generally indicated by the numeral 42. The relay has a coil 42a, a normally open switch 42b, and a normally closed switch 42c. With ignition switch 20 on and coolant at its normal level so that, in effect, switch 14 is closed, relay 42 is energized closing switch 42b which actuates valve 24, moving the valve closure member to the full open position, allowing unrestricted fuel flow to the engine. At the same time, switch 42c is opened.

If the coolant level drops below normal, in effect opening switch 14, relay 42 is de-energized, opening switch 42b and causing valve 24 to move to the restricted flow condition. At the same time, switch 24c closes. In series with switch 42c is an indicator light 44, which when energized, indicates to the vehicle operator that low coolant level has occurred.

Relay 42 can be a mechanical type, as shown, or it may be solid state. In like manner, the valve 24 is shown merely by way of example and may be arranged in many other forms. The valve may be a normally open type which is closed to cause reduced fuel flow by energization rather than opened as in the illustrated arrangement. Thus it can be seen that the actual practice of the invention may depart greatly from the illustrated arrangement. Various means other than the two means illustrated in FIGS. 3 and 4 may be employed to provide restricted fuel flow through a valve in one condition and unrestricted fuel flow in another condition. It is understood that the invention is not limited to the embodiments set forth herein for purposes of illustration, but is to be limited only by the scope of the attached claim or claims, including the full range of equivalency to which each element thereof is entitled.

What is claimed is:

1. In a vehicle having a radiator, the radiator having liquid coolant therein, the vehicle having an engine operated on fluid fuel, a fuel source and a conduit connecting the fuel source to the engine, a low coolant level protection system comprising:
   a. a probe extending within the upper portion of the radiator and insulated from it, the probe having conductive contact with the coolant when the coolant is at normal operating levels;
   b. a battery having one pole connected to ground and to the radiator providing continuity with the coolant herein;
   c. a relay having a coil, a normally open switch and a normally closed switch, the relay coil being in electrical series with said battery, said probe and to ground, whereby said coil is energized when continuity is made between said probe and coolant in said radiator;
   d. a solenoid valve having:
      1. a fluid passageway therethrough connected in said conduit between said fuel source and engine of the vehicle;
      2. a valve seat forming a part of said fluid passageway;
      3. a solenoid in electrical series with said relay normally open switch, said battery and ground;
      4. a plunger acted upon by said solenoid, the plunger having a sealing face engagable with said valve seat when the valve is in the closed position, the plunger sealing face having a shallow depth groove therein permitting restricted flow of fuel through the valve when the valve is in the closed position; and
      5. a spring normally retaining the valve plunger in closed position except when said solenoid is energized to withdraw said plunger against said spring in which case unrestricted flow of fuel through the valve is provided;
   an indicator light in series with said relay normally closed switch said battery and ground;
   whereby when said coolant level in said radiator is at a normal operating level continuity is provided through said radiator, coolant and probe to energize said relay to close said normally open switch and thereby energize said valve solenoid, moving said plunger to the opened position allowing unrestricted fuel flow to said engine and wherein low coolant level causes continuity to be lost between said coolant and said probe, de-energizing said relay to open said normally open switch thereby de-energizing said valve solenoid, said spring serving to close said plunger against said valve seat, permitting only restricted fuel flow through said shallow depth groove in said plunger to said engine, said indicator light being energized when said relay coil is de-energized to indicate the condition of low coolant level.

* * * * *